United States Patent [19]

Karabedian

[11] Patent Number: 4,585,679
[45] Date of Patent: Apr. 29, 1986

[54] COEXTRUDED MULTILAYER SHEET AND TOUGH SLEEVE LABEL MADE THEREFROM

[75] Inventor: James A. Karabedian, Toledo, Ohio

[73] Assignee: Owens-Illinois, Inc., Toledo, Ohio

[21] Appl. No.: 691,256

[22] Filed: Jan. 14, 1985

[51] Int. Cl.[4] .................. B65D 23/08; B32B 27/08
[52] U.S. Cl. .................................... 428/35; 428/36; 428/515; 428/517; 428/318.6; 428/319.3; 428/318.4; 428/913; 215/12 R
[58] Field of Search .............. 428/35, 36, 515, 516, 428/517, 318.6, 319.3, 319.7, 319.9, 318.4

[56] References Cited

U.S. PATENT DOCUMENTS 4,069,934  1/1978  Karabedian ..................... 428/35
4,111,349  9/1978  Buckler et al. ................... 428/319.9
4,463,861  8/1984  Tsubone et al. ................... 428/35

Primary Examiner—John E. Kittle
Assistant Examiner—Thomas C. Saitta
Attorney, Agent, or Firm—John R. Nelson

[57] ABSTRACT

A coextruded multilayer heat shrunk plastic sleeve label having a tough skin layer and a brittle polystyrene foam layer, the skin layer being extruded from a blend of low density polyethylene, a block copolymer of butadiene and styrene as a compatibility agent and optionally, small amounts of polystyrene. The amount of the block copolymer used is sufficient to provide limited adhesion between the skin and foam layers to maximize the toughness of the total label structure. The sleeve label can be sealed by ultrasonic, hot air and heat sealing.

9 Claims, 4 Drawing Figures provided on the underside near the leading edge and a finite area 66 is provided on the trailing edge. These finite areas are tacky areas of hot melt adhesive to enable the sleeve to be wrapped around the container and a side seal seam formed. In the alternative, a sleeve can be formed on a mandrel and telescopically moved from the mandrel and around the container encircling the latter to be heat shrunken in firm, conforming contact on the container outer surface. In such case, the side seam of the sleeve may be either hot air or heat sealed.

Coextrusion of multilayer sheets is known in the art, as for instance, generally disclosed in U.S. Pat. No. 4,244,900 to James E. Heider. As is known, heat shrinkable multilayer sheets for heat shrunk sleeve labels can be made by coextrusion that comprises concurrently extruding a foamed film (for instance, a polystyrene foamed film) and a nonfoamed solid skin film (for instance, a polystyrene film). The foamed film side of the laminate is generally cooled more quickly than the skin film, the foamed side having more shrinkage than the skin side when later used as a heat shrunk sleeve label for containers.

The skin and foam layers are oriented and will shrink down on the container when heated, say above the softening point ($t_g$) of the foam material around, for instance, 180° or 200° up to 230° F. or 250° F. or more. The heat for shrinking the sleeve labels in high speed production operations is often infrared sources as is known in the art. Method and apparatus for applying heat shrunk plastic sleeve labels to containers are shown in U.S. Pat. Nos. 3,959,065 (Ashcroft) and 3,767,496 (Amberg et al) assigned to Owens-Illinois, Inc.

In accordance with the present invention, it is now recognized that the tough skin 15 and brittle foam 20 must not be too well bonded or the benefits of the toughness of the skin will be lost. As seen in the greatly enlarged cross section shown in FIG. 4, the shear bond strength of the skin and foam layers is less than the yield strength of the tough skin to maximize the toughness of the total label structure. When forces are applied to the laminate in the direction of the arrows shown in FIG. 4, the foam layer 20 tears slightly at 70 to pull away from the adjacent surface 75 of the skin. The skin resists tearing and stretches and necks down slightly at 80 but does not break until stretched beyond the elastic limit of the skin.

Although not wishing to be bound by theory, the suggested label structure can be illustrated by a number of styrenic sites near and at the interface of the skin and foam layers. The sites are very small styrenic groups that are located randomly in the skin layer and generally predominantly in the foam layer to form compatible bonding areas in sites along the interface, especially when solvent sealing is employed to make and seal the side seam. Apparently there is an intermingling of molecules of styrene in the skin and the foam. The more sites that are in the structure, the stronger the bond between the foam and skin layers. Hence, to obtain the more desirable limited adhesion, the fewer the sites, the lower the bond strength.

Polystyrene is a highly preferred polymer for foam layer. The polystyrene can be crystal (general purpose) polystyrene or impact (rubber-modified) polystyrene. A suitable polystyrene foam, is generally a low density foam, say about 3 or 4 up to 14 or 15 lbs. per cubic foot or a medium to high density foam of about 15 to 45 or 50 lbs. per cubic foot.

Other preferred polymers that can be used for part or all of the polystyrene, for most applications, are styrenic polymers such as copolymers of styrene and a vinyl copolymerizable monomer including vinyl acetate, vinyl chloride, vinylidene chloride and acrylic and acrylate monomers such as methyl methacrylate and ethyl methacrylate. It is preferred that the amount of styrene in styrenic polymer be at least about 40 or 50% by weight and, for best results, about 60 to 75%.

The thickness of the foam layer can vary from about 1 or 2 mils up to about 15 or 20 mils, but the preferred thickness is about 8 to 10 mils.

An outstanding label is one that has two layers, it being a coextruded structure of a solid polymer skin layer and a foamed layer. The solid skin layer of the multilayered label can be about ¼ or ½ to 5 mils in thickness and the foam layer about 3 to 20 and preferably 4 to 12 mils.

Good results have been obtained with a total label structure of a 2 mil skin layer of 50 wt. % linear low density polyethylene and 50 wt. % of a block copolymer of styrene and butadiene having 43 wt. % bound styrene and a number average molecular weight of about 80,000, the skin layer being bonded to a coextruded polystyrene foam layer of about 5 mils. Good results also have been obtained with a label as above described with 70 wt. % low density polyethylene and 30 wt. % of the copolymer.

The tough skin/brittle foam laminate is protected from degradation from heat, light and oxygen by antioxidants or other stabilizers including UV absorbers, hindered amine light stabilizers, antioxidants and nickel quenchers. Suitable stabilizers include UV stabilizers based on hydroxy phenyl benzotriazole including Tinuvin TM 328 (Ciba-Geigy); hindered amine light stabilizers including Tinuvin TM 292 (Ciba-Geigy); antioxidants including Iganox hindered phenolic compounds such as Iganox TM 1010, 1076 and B225 (Ciba-Geigy) a synergistic combination of an organophosphite and a hindered phenol; and a nickel phosphonate such as Irgastab TM 2002 (Ciba-Geigy).

Another advantage obtained by using the compatibilized polyolefin (the linear low density/block copolymer blend) is being able to incorporate scrap or cullet back into the foam layer and still obtain substantially all the results and advantages of the invention.

What is claimed is:

1. A coextruded multilayer sheet adapted to form a sleeve label for a container, the sheet comprising a polystyrene foam layer adapted to be wrapped next to the container and a solid skin layer adapted for decoration, the solid skin layer being extruded from a blend comprising about 50 to 70 parts by weight of linear low density polyethylene, about 20 to 60 parts by weight of a block copolymer of styrene and butadiene, and about 0 to 10 parts by weight of polystyrene; the amount of block copolymer being sufficient to balance the adhesion between the foam layer and the skin layer at the interface thereof, the adhesion being enough to prevent premature delamination and tearing and the adhesion being low enough to maximize the toughness of the label.

2. A sheet as defined in claim 1 in which the blend is about 50–70 parts linear, low density polyethylene, about 30–50 parts of the block copolymer.

3. A sheet as defined in claim 1 in which the copolymer has about 35 to 55 wt. % bound styrene.

COEXTRUDED MULTILAYER SHEET AND TOUGH SLEEVE LABEL MADE THEREFROM

The present invention relates to a coextruded multilayer sheet adapted to form a tough sleeve label for wrapping around a container.

BACKGROUND OF THE INVENTION

Laminated (coextrusion coated) sheets for sleeve labels for containers are disclosed in the prior art, for example, U.S. Pat. Nos. 3,979,000 and 4,069,934 of James Karabedian, U.S. Pat. No. 3,760,968 of Amberg et al, all of the above being assigned to Owens-Illinois, Inc. U.S. Pat. No. 4,463,861 of Tsubone et al also discloses a laminated (coextruded two-layer) sheet and a heat shrinkable sleeve label for wrapping containers. The laminated sheet sleeve label comprises a solid film comprising polystyrene containing more than 50% by weight of styrene residues and foamed film comprising polystyrene containing more than 50% by weight of styrene and optionally not more than 30% by weight of rubber.

The prior art coextruded multilayer sleeve labels having polystyrene-type layer do not have as much toughness as desired.

OBJECTS OF THE INVENTION

It is an object of the present invention to provide a tough, attractive coextruded multilayer sheet sleeve label for a container such as an oriented plastic carbonated beverage container.

It is an object of the present invention to provide a coextruded multilayer sheet adapted to form a sleeve label for wrapping a container, the sheet comprising a polystyrene foam layer adapted to be wrapped next to the container and a solid skin layer adapted for decoration, the solid skin layer being extruded from a blend comprising about 50 to 70 parts by weight of linear low density polyethylene, about 20 to 60 parts by weight of a block copolymer of styrene and butadiene, and about 0 to 10 parts by weight of polystyrene; the amount of block copolymer being sufficient to balance the adhesion between the foam layer and the skin layer at the interface thereof, the adhesion being enough to prevent premature delamination and tearing and the adhesion being low enough to maximize the toughness of the total label structure.

These and other objects will become apparent from the specification that follows, the appended claims and the drawings in which:

THE INVENTION

Figure 1:
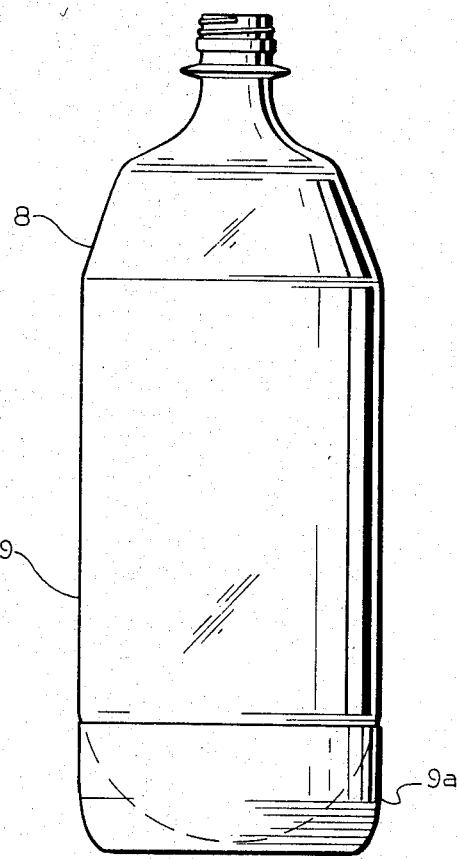
FIG. 1 is an elevational view of a container, the container being an oriented plastic container with a base cup.

It has not been recognized in the art that a structure of a coextruded tough skin/brittle foam must not be too well bonded or the benefits of the toughness of the skin layer will be lost. However, as a practical matter, there must be some degree of adhesion. The present invention provides a means of balancing the adhesion between the tough skin layer and the brittle foam layer to maximize the toughness of the total label structure.

The toughness is maximized when the shear bond strength between the skin layer and the foam layer is as close to unity as possible but less than the yield strength of the skin layer.

The present invention provides a tough, attractive, sealable coextruded multilayer sheet adapted for forming a snug, wrinkle-free heat shrunk sleeve label around a container including an oriented plastic beverage bottle that tends to expand after filling. The tough sleeve label is easily sealable, a strong side seam being formed, for instance, by high speed sealing means such as hot melt adhesive, ultrasonic, hot air and heat sealing.

The present invention provides a coextruded multilayer sheet adapted to form a sleeve label for a container, the sheet comprising a polystyrene foam layer adapted to be wrapped next to the container and a solid skin layer adapted for decoration, the solid skin layer being extruded from a blend comprising about 50 to 70 parts by weight of linear low density polyethylene, about 20 to 60 parts by weight of a block copolymer of styrene and butadiene, and about 0 to 10 parts by weight of polystyrene; the amount of block copolymer being sufficient to balance the adhesion between the foam layer and the skin layer at the interface thereof, the adhesion being enough to prevent premature delamination and tearing and the adhesion being low enough to maximize the toughness of the total label structure. It is preferred that the blend be about 50 to 55 parts by weight of the polyethylene and about 45 to 50 parts of the copolymer.

The block copolymer is one of styrene and butadiene, for instance, prepared by anionic polymerization. The copolymers are thermoplastic rubbers, showing the behavior of vulcanized elastomers at room temperature, with hard chain lengths or blocks of styrene acting similarily to crosslinks to prevent creep in the polybutadiene block matrix. At higher temperatures, they undergo normal plastic flow.

The butadiene component of the copolymer can be replaced by isoprene or ethylene butylene as, for instance, is available as KRATON ™ rubber materials including 1102 and 1107 from Shell Chemical.

Stereon 840A and other Stereon ™ elastomers, available from Firestone, Akron, Ohio, are preferred butadiene-styrene block copolymer elastomers, the preferred block copolymer containing about 35 to 55 wt. % bound styrene and having a number average molecular weight of about 50,000 to 100,000. Stereon 840A brochures list two of the block copolymers having 53 and 43 wt. % bound styrene and number average molecular weight about 60,000 to 80,000.

Figure 2:
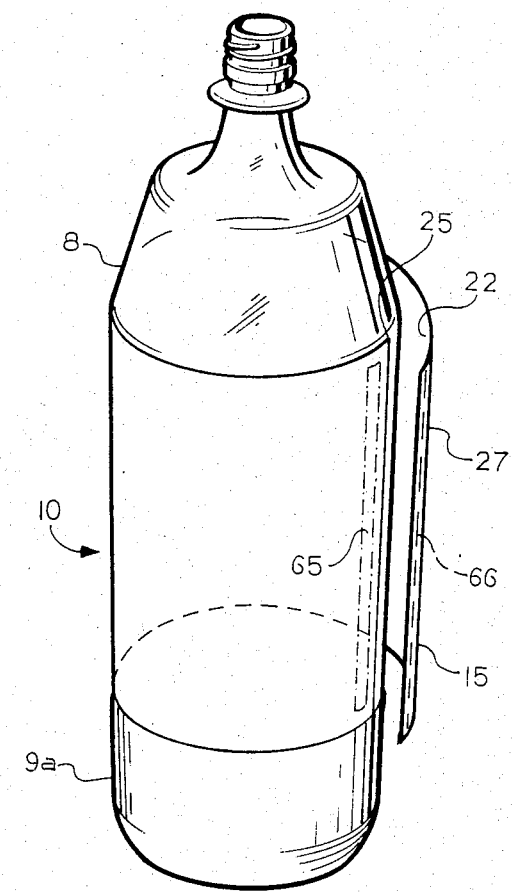
FIG. 2 is a perspective view of the container of FIG. 1 with a plastic oriented sleeve label made according to the present invention being partially wrapped around the container.

As seen in the drawings, a container 8 having a body portion 9 and a base cup 9a is shown partially wrapped with a label 10 in FIG. 2.

Figure 3:
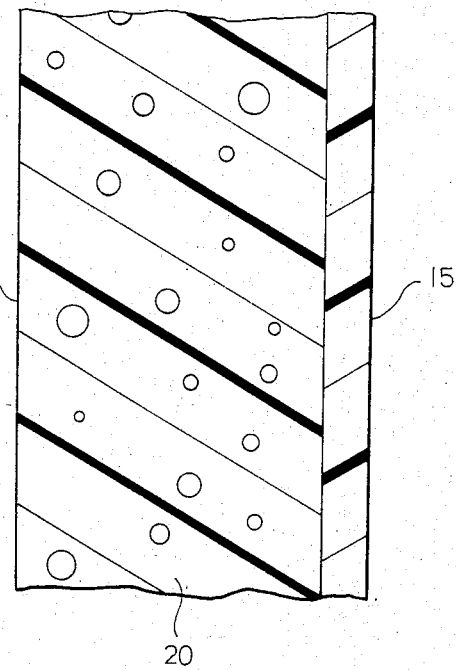
FIG. 3 is an enlarged fragmentary sectional view of the label showing a solid skin layer and a foamed layer.
Figure 4:
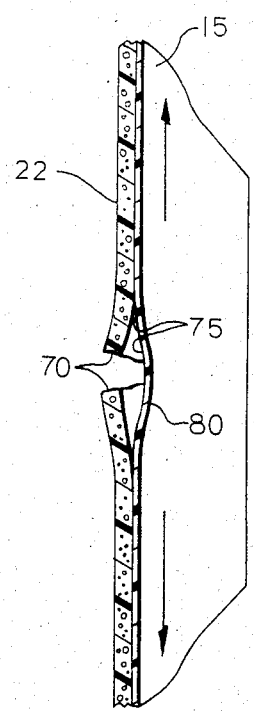
FIG. 4 is a greatly enlarged sectional view of the label showing a slight tear in the foamed layer when stretching forces are applied thereto, the tough skin layer remaining intact.

As seen in FIGS. 2 and 3, in the embodiment shown, the label has an outer solid polymer layer 15 and a foam layer 20. The foam layer 20 has an underside 22, a leading edge 25 and a trailing edge 27. Finite areas 65 are 4. A sheet as defined in claim 1 in which the copolymer has about 43 to 53 wt. % bound styrene and a number average molecular weight of about 50,000 to 100,000.

5. A container and a coextruded multilayer sheet in the form of a sleeve label for the container, the sheet comprising a polystyrene foam layer adapted to be wrapped next to the container and a solid skin layer, the solid skin layer being extruded from a blend comprising about 50 to 70 parts by weight of linear low density polyethylene, about 20 to 60 parts by weight of a block copolymer of styrene and butadiene, and about 0 to 10 parts by weight of polystyrene; the amount of block copolymer being sufficient to balance the adhesion between the foam layer and the skin layer at the interface thereof, the adhesion being enough to prevent premature delamination and tearing and the adhesion being low enough to enhance the toughness of the label structure.

6. A container and sheet as defined in claim 5 in which sheet is defined in claim 1 in which the blend is about 50-70 parts linear, low density polyethylene, and about 30-50 parts of the block copolymer.

7. A container and sheet as defined in claim 5 in which the container is an oriented plastic container.

8. A container and sheet as defined in claim 5 in which the container is an oriented polyethylene terephthalate carbonated beverage container.

9. A container and sheet as defined in claim 5 in which the container is a glass container.

* * * * *